United States Patent Office 2,922,824
Patented Jan. 26, 1960

2,922,824
STABILIZATION OF PERFLUOROCHLOROOLEFIN POLYMERS

Francis J. Honn, Westfield, and Fred W. West, Patterson, N.J., assignors, by mesne assignments, to Minnesota Mining and Manufacturing Company, St. Paul, Minn., a corporation of Delaware No Drawing. Application September 23, 1955
Serial No. 536,264

20 Claims. (Cl. 260—652.5)

This invention relates to the treatment of perfluorochloroolefin polymers. In one of its aspects the invention relates to the stabilization of perfluorochloroolefin oils and waxes. In one of its more particular aspects this invention relates to a method for improving the heat-aging characteristics, i.e., the thermal stability of trifluorochloroethylene polymers.

Polymerization of the perfluorochloroolefins can be effected so as to yield a variety of polymeric materials. For example, trifluorochloroethylene can be polymerized to yield oils and waxes. The physical and chemical characteristics of these perfluorochloroolefin polymers are different from the characteristics of similar but non-fluorinated polymeric materials. The chemical resistance, for example of polytrifluorochloroethylene, is such that it will withstand exposure to a wide variety of oxidizing materials. Physically, the material possesses high heat stability and excellent electrical properties. Because of their high heat stability the perfluorochloroolefin polymers are widely used under adverse temperature conditions for example, as transformer oils, hydraulic fluids, etc.

Despite their high degree of chemical stability, the perfluorochloroolefin polymers are still somewhat subject to the effects of heat, particularly when maintained at elevated temperatures for prolonged periods of time. Upon prolonged exposure to high temperature, degradation occurs. This degradation is, in reality, a thermal cracking of the polymer chain with a consequent reduction of molecular weight of the polymer and is evidenced by a change in color of the polymer and also by a change in viscosity and other physical characteristics.

It is an object of this invention to provide a process for improving the thermal stability of the low molecular weight perfluorochloroolefin polymers during distillation.

It is another object of this invention to provide a means for stabilizing the perfluorochloroolefin polymers while in use.

It is one of the more particular objects of this invention to improve the thermal stability of polymers of trifluorochloroethylene.

Various other objects and advantages will become apparent to those skilled in the art from the accompanying description and disclosure.

Generally, the above objects are accomplished by maintaining the polymer in contact with cadmium, particularly while at elevated temperatures. As will become apparent hereinbelow, the cadmium can be in metallic form, e.g., as a plating on the walls of a metal container which are in contact with the polymer or as finely-divided metal chips (mossy cadmium) suspended in the polymer and can also be in the form of the organic and inorganic salts of cadmium which are admixed with the polymer.

The low molecular weight perfluorochloroolefin polymers, which are stabilized by the process of this invention, are prepared by the polymerization of the monomer to produce oils and waxes. Within the group of perfluorochloroolefin polymers are polymers obtained by the homopolymerization of trifluorochloroethylene, dichlorodifluoroethylene, trichlorofluoroethylene and copolymers of the above described perfluorochloroolefins copolymerized with hydrogen-containing halogenated olefins, such as vinyl chloride, vinyl fluoride, vinylidene chloride, vinylidene fluoride and trifluoroethylene. The term "polymer" includes both homopolymers and copolymers. The term "telomer" includes both homotelomers and cotelomers. The term "polymer" is generic to the term "telomer" which in a sense is a species of polymer.

The above described perfluorochloroolefin polymers, and particularly polymers of trifluorochloroethylene can be produced by thermally cracking the normally solid perfluorochloroolefin polymer or by the telomerization of a perfluorochloroolefin in the presence of a telomerization agent or telogen, such as a sulfuryl halide. The preparation of distillable polymer by the cracking process is described in U.S. Patent No. 2,636,907, issued April 28, 1953, to W. T. Miller. Low molecular weight polymer produced by the thermal cracking process has a relatively high fluorine content as compared with telomer due to the fluorine stabilization treatment, a random number of carbon atoms and no single identifiable species. The end groups on cracked polymer are uncertain but are believed to be fluorine. Preparation of telomers is achieved by a telomerization reaction which is a relatively new technique for preparing perfluorochloroolefin polymers, or more correctly, telomers. The telomer product has an even number of carbon atoms and halogen terminal groups which, since sulfuryl chloride is usually used as the telogen, are usually chlorine. The reaction occurs essentially as shown below in a typical reaction using chlorotrifluoroethylene and sulfuryl chloride as an example.

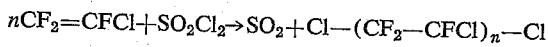

$nCF_2=CFCl + SO_2Cl_2 \rightarrow SO_2 + Cl-(CF_2-CFCl)_n-Cl$

As shown, sulfur dioxide gas is formed as well as a clear polymeric mixture which includes various grades of telomeric halocarbons, such as liquids, oils and waxes. These telomeric halocarbons may be separated by vacuum distillation. The distillable substances obtained by telomerizing chlorotrifluoroethylenic compounds in the presence of sulfuryl chloride are sufficiently stable as not to absorb appreciable amounts of fluorine even though exposed to the gas for 24 hours at a temperature of 60° C. or to pyrolyze significantly at temperatures up to 200° C.

The halogen atoms of the sulfuryl halides are selected from the group consisting of fluorine, chlorine and bromine, and mixtures thereof. The preferred telogen, sulfuryl chloride, is usually prepared by the catalytic combination of sulfur dioxide and chlorine gas. Other sulfuryl halides useful in the present invention, include $SO_2F_2$, $SO_2Br_2$, $SO_2FCl$, and $SO_2BrCl$. It is also possible to generate the sulfuryl halide in situ, i.e., by passing into the telomerizing mass a mixture of $SO_2$ and halogen, in the proper stoichiometric quantities, either as liquids or gases or both.

The compounds formed by telomerization in the presence of a sulfuryl halide have the general formulae:

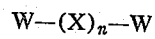

$W-(X)_n-W$ wherein W is a member selected from the group consisting of fluorine, chlorine and bromine, X is a haloolefinic, preferably haloethylenic, monomer unit and n is an integer greater than one, preferable at least 4 and preferably not more than 20 and

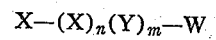

$X-(X)_n(Y)_m-W$ wherein W is a member selected from the group consisting of fluorine, chlorine and bromine, X and Y are different haloolefinic, preferably ethylenic, monomer units and $n$ and $m$ are integers and preferably each is greater than one, and each is not greater than 10. The preparation of a homotelomer of trifluorochloroethylene is illustrated in the following example.

EXAMPLE 1

Telomerization of chlorotrifluoroethylene

The pressure system was flushed out with nitrogen and charged with a peroxide solution (3.5 parts of benzoyl peroxide dissolved in 308 parts of carbon tetrachloride) and 135 parts of sulfuryl chloride. The system was cooled to about −25° C. or lower and 116 parts of chlorotrifluoroethylene monomer was added. The system was closed and heated to about 95° C. for a period of four hours during which time the mixture was mechanically agitated. A maximum gage pressure of 300 pounds per square inch was reached and then gradually subsided. At the end of the telomerization the gases were bled from the system and the liquid product was transferred to a distilling pot. The excess sulfuryl chloride and carbon tetrachloride (solvent) were boiled off by heating the mixture to a pot temperature of 165° C. at atmospheric pressure. The gel-like product was distilled at a vapor temperature up to 175° C. at 35 mm. of mercury to remove very low molecular weight polymers. Final distillation was conducted at 0.5 mm. pressure and at a vapor temperature up to about 230° C. The telomerization yield was 78 percent with 93 percent of the product distilled.

Irrespective of the technique used in preparing the polymer, the product obtained is a mixture of oils and waxes. This mixture is usually distilled into suitable fractions or cuts prior to use. The homotelomer of trifluorochloroethylene, for example, is usually distilled into fractions, such as shown below in the table.

face, the cadmium can be added in the form of metal fillings, chips, cartridges, etc., or in the form of an inorganic salt, such as cadmium chloride, cadmium sulfate, etc., provided that the presence of suspended particles does not adversely interfere with the use for which the polymer is intended. Where the presence of suspended particles is objectionable, then the cadmium can be added in the form of a perfluorochloro carboxylic acid salt of cadmium which is soluble in the perfluorochloroolefin polymer. A variety of perfluorochloro carboxylic acid salts of cadmium can be employed, although the preferred salts are those having the formula:

$$[Z(CF_2CFCl)_nCF_2COO]_2Cd$$

in which Z is selected from the group consisting of fluorine, chlorine and bromine, and $CCl_3$, $CF_3$, and $CBr_3$, and $n$ is an integer from 2 to 10. The preparation of the perfluorochloro carboxylic acid salts of cadmium is described below.

Stabilization of the polymer is effected in the case of metal stills, etc., by having a major proportion of the exposed metal surface plated with cadmium. Where cadmium metal and the inorganic cadmium salts are suspended in the polymer, the concentration of metal or salts is between about 1 and about 10 percent weight based on the weight of polymer, and preferably between about 1 and about 5 percent. Where perfluorochloro carboxylic acid salts of cadmium are employed, the quantity should not exceed more than that required to form a saturated solution of the salt, usually about 1 weight percent based on the weight of polymer, since otherwise the added organic cadmium salt will act as a gelling agent. Moreover, higher quantities of the organic cadmium salts will not be soluble, hence the added amount will be of no particular value.

The following examples illustrate the effectiveness of

TABLE.—PHYSICAL PROPERTIES OF TRIFLUOROCHLOROETHYLENE TELOMER OIL

| Telomer Oil Fraction | Boiling Range, °C. at 0.5 mm. | Approx. Molecular Weight | Density | | Viscosity, cs. | | M.P., °F. | Pour Pt., °F. |
|---|---|---|---|---|---|---|---|---|
| | | | 100° F. | 210° F. | 68° F. | 130° F. | | |
| 1 | 20–95 | 460 | 1.823 | 1.720 | 4.0 | | | −35 |
| 2 | 95–132 | 570 | 1.862 | 1.768 | 12.3 | 3.7 | | −35 |
| 3 | 132–170 | 680 | 1.910 | 1.823 | 108 | 14.4 | | −25 |
| 4 | 170–207 | 800 | 1.940 | 1.853 | a 2.7 | b 8.9 | | 35 |
| 5 | 207–245 | 1,000 | 1.962 | 1.875 | a 1,578 | b 27.2 | 95 | 85 |
| 6 | 245–270 | 1,600 | | | | b 371.6 | 175 | 165 | a At 100° F.
b At 210° F.

Polymer produced by thermally cracking and by polymerization in the presence of chain transfer solvents, is also distilled into fractions having approximately the same boiling range, although the other physical properties will differ.

Distillation of the perfluorochloroolefin polymer, produced by the above described process, is carried out at relatively high temperatures which results in the production of discolored product. Usually, the discolored material remains in the still so that the wax residue becomes objectionably colored a dark brown. Individual fractions which are placed in service at high temperature, also become discolored over a period of time. However, when perfluorochloroolefin polymers are placed in contact with cadmium, discoloration does not occur.

As indicated previously, the above described perfluorochloroolefin polymers are stabilized against thermal degradation by the presence of cadmium. In distillation processes, which are carried out in metal stills, or where the perfluorochloroolefin polymer is used at relatively high temperatures in contact with the walls of a metal container, vessel or still the cadmium can be present as a plating on the walls. In distillation or other uses where the polymer is not in contact with a metal surcadmium as a stabilizer in the process of this invention.

EXAMPLE 2

Three tubes, one containing 50 grams of a homotelomer of trifluorochloroethylene (fraction 6 in the table of physical properties); the second containing 50 grams of homotelomer of trifluorochloroethylene (fraction 6) and 2 grams of Monel metal chips; and the third containing 50 grams of a homotelomer of trifluorochloroethylene (fraction 6), 2 grams of Monel metal chips and 0.5 gram of $[Cl(CF_2CFCl)_3CF_2COO]_2Cd$, were sealed in a vacuum and placed in an oven for 48 hours at 249° C. After this heating period the tubes were examined. The contents of the first and second tubes had become dark brown but the contents of the tube containing 0.5 gram of cadmium salt was pale yellow.

EXAMPLE 3

A tube containing 50 grams of a homotelomer of trifluorochloroethylene (fraction 6) and 2 grams of cadmium metal (granular—mossy—99.8 percent pure) was sealed in a vacuum and heated for 65 hours at 249° C. The content of the tube after this heating period was a light straw colored liquid.

EXAMPLE 4

A homotelomer of trifluorochloroethylene (fraction 6) (15 pounds) and mossy cadmium 5 percent by weight, were placed in beakers and heated in an open furnace at about 249° C. for 48 hours. The oil after heating had a yellowish color.

EXAMPLE 5

Substantially equivalent results are obtained when approximately 1 gram of cadmium chloride, cadmium sulfide, cadmium sulfate, and cadmium carbonate are substituted for the one-half gram of $$[Cl(CF_2CFCl)CF_2COO]_2Cd$$

EXAMPLE 6

Substantially equivalent results are obtained when each of the fractions 1–5 are substituted for fraction 6 in Example 1. Substantially equivalent results are also obtained with each of these fractions using cadmium chloride, cadmium sulfide, cadmium sulfate, and cadmium metal in approximately 1 gram quantities.

EXAMPLE 7

This example illustrates the use of cadmium in the distillation of telomer product.

Approximately 360 pounds of telomer product prepared as described in Example 1, was distilled into dimer, trimer, tetramer, and pentamer. The distillation was carried out in a glass still to which mossy cadmium metal had been added. The color of the still residues was yellowish. In runs conducted in glass apparatus in the absence of cadmium metal, the still residue was usually dark brown, and in some instances, appeared to have charred.

EXAMPLE 8

This example illustrates the distillation of telomer product in stainless steel equipment which is cadmium plated.

Approximately 400 pounds of telomer product prepared as described in Example 1, is distilled into dimer, trimer, tetramer, and pentamer, in a stainless steel cadmium plated still. The still residue is colored light yellow. In the absence of cadmium plating, the still residue is dark brown.

As indicated previously, the cadmium salts of the perfluorochloro aliphatic acids are new compounds. For the purpose of clarity, the method of preparing these new compounds is described hereinbelow. The new compounds which are cadmium salts of the perfluorohalo aliphatic carboxylic acids, are derived by appropriate reaction of a saturated perfluorohalo compound. These saturated perfluorohalo compounds are prepared by telomerizing an appropriate perfluorohaloethylenic starting material using a sulfuryl halide telogen as described in Example 1. The physical characteristics of some of the individual telomer products and of mixtures of such products which are used in a synthesizing of the cadmium salts, are given in Table II below.

TABLE II.—PHYSICAL PROPERTIES OF INDIVIDUAL TRIFLUOROCHLOROETHYLENE SULFURYL CHLORIDE TELOMER PRODUCTS

| Individual Telomer Products | Boiling Point, ° C. | Index of Refraction ($n_D^{20}$) |
|---|---|---|
| (1) $Cl-(CF_2-CFCl)_2-Cl$ | 134 | 1.3820 |
| (2) $Cl-(CF_2-CFCl)_3-Cl$ | 203 | 1.3956 |
| (3) $Cl-(CF_2-CFCl)_4-Cl$ | 255 | 1.4018 |
| (4) $Cl-(CF_2-CFCl)_5-Cl$ | 300 | 1.4024 |
| (5) $Cl-(CF_2-CFCl)_6-Cl$ | 335 | 1.4110 |

By starting with an appropriate telomer fraction as indicated in the above table, a variety of cadmium salts can be prepared by hydrolyzing the starting telomer material with sulfuric acid containing sulfur trioxide at elevated temperatures. By proper control of the temperature, duration of treatment and concentration of the fuming sulfuric acid, monoacids are produced.

Formation of the monoacids of the telomers described above, and particularly telomers having the formula $Cl(CF_2CFCl)_n-Cl$, is accomplished by hydrolyzing the telomer with concentrated sulfuric acid containing from substantially 0 to about 70 percent excess $SO_3$ at a temperature ranging from about 140° C. to about 300° C. for a period ranging from about 5 to about 50 hours. In general, a lower concentration of fuming sulfuric acid (containing about 0 to about 20 percent $SO_3$), lower temperatures (between about 140 and about 210° C.) and shorter reaction times (5 to 25 hours) are sufficient to hydrolyze the $CFCl_2$ group to COOH, the diacid being formed in lower yield if at all, under such conditions. The monoacid thus produced, is then neutralized to a phenolphthalein end point with sodium hydroxide in aqueous solution to yield the sodium salt. The sodium salt is then precipitated out of the solution by the addition of cadmium nitrate, and the resulting precipitate is recovered by filtration, washed free of water soluble impurities and dried overnight at elevated temperatures, e.g., about 100° C. The following example illustrates the preparation of $[Cl(CF_2CFCl)_3CF_2COO]_2Cd$.

EXAMPLE 9

A mixture containing 161 grams (0.3 mole, 86 ml.) of $Cl(CF_2CFCl)_4Cl$ (boiling point 125° C./10 mm.), and 200 ml. of 20 percent fuming sulfuric acid was heated with stirring at reflux temperature for 46 hours. The viscous lower layer was diluted with carbon tetrachloride, washed with 25 percent hydrochloric acid, and dissolved to yield 85 grams (50 percent yield of acidic material 150–160° C./10 mm.). The product was identified by analysis as the monocarboxylic acid having the formula $Cl(CF_2CFCl)_3CF_2-COOH$. This acid was dissolved in water by warming to 40–50° C. on a hot plate and neutralized to a phenolphthalein end point with a 5 percent sodium hydroxide solution. Cadmium nitrate was added to the neutralized solution with stirring to precipitate the cadmium salt. The precipitate which formed as filtered, washed with water and dried overnight at 105° C.

By stirring with any of the compounds listed in Table II and employing the technique described in Example 9, a variety of cadmium salts can be prepared. These salts have the general formula $$[Cl(CF_2CFCl)_nCF_2COO]_2Cd$$

in which $n$ is an integer from 1 to 5.

Various modifications and alterations of the process of this invention will be apparent to those skilled in the art and may be used without departing from the scope of this invention.

Having thus described our invention, we claim:

1. A process for stabilizing liquid perfluorochloroolefin polymers containing only chlorine and fluorine attached to the carbon chain which comprises maintaining the polymer in contact with a stabilizer comprising cadmium.

2. A process for stabilizing lower molecular weight perfluorochloroolefin polymers containing only chlorine and fluorine attached to the carbon chain against thermal degradation during distillation which comprises distilling the polymer in the presence of a stabilizer comprising cadmium.

3. A process for stabilizing perfluorochloroolefin polymers containing only chlorine and fluorine attached to the carbon chain against thermal degradation which comprises maintaining the polymer in contact with a stabilizer comprising cadmium while at an elevated temperature.

4. A process for distilling an open chain telomer containing a plurality of trifluorochloroethylene monomer units and chlorine terminal groups boiling between about −20 and about 270° C. at 0.5 mm. which comprises distilling said open chain telomer in the presence of a stabilizer comprising cadmium.

5. The process of claim 4 in which the cadmium is in the form of a plating.

6. The process of claim 4 in which the cadmium is mossy cadmium.

7. A novel composition comprising an admixture of a perfluorochloroolefin polymer containing only chlorine and fluorine attached to the carbon chain and between about 1 and about 10 weight percent based on the weight of polymer of a stabilizer comprising cadmium.

8. A novel composition comprising an admixture of a low molecular weight trifluorochloroethylene polymer containing only chlorine and fluorine attached to the carbon chain and between about 1 and about 10 weight percent based on the weight of polymer of metallic cadmium.

9. A novel composition comprising an admixture of a low molecular weight trifluorochloroethylene polymer containing only chlorine and fluorine attached to the carbon chain and between about 1 and about 10 weight percent of an inorganic cadmium salt.

10. A novel composition comprising an admixture of a low molecular weight trifluorochloroethylene polymer containing only chlorine and fluorine attached to the carbon chain and between about 1 and about 10 weight percent based on the weight of polymer of cadmium sulfate.

11. A novel composition comprising an admixture of a low molecular weight trifluorochloroethylene polymer containing only chlorine and fluorine attached to the carbon chain and a perfluorohalocarboxylic acid salt of cadmium in an amount not exceeding that required to form a saturated solution with said low molecular weight polymer.

12. The composition of claim 11 in which the perfluorohalocarboxylic acid salt of cadmium is

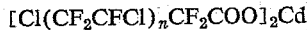
[Cl(CF$_2$CFCl)$_n$CF$_2$COO]$_2$Cd in which $n$ is an integer from 1 to 5.

13. The composition of claim 11 in which the perfluorohalocarboxylic acid salt of cadmium is

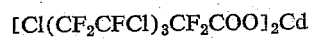
[Cl(CF$_2$CFCl)$_3$CF$_2$COO]$_2$Cd

14. A novel composition comprising an admixture of a low molecular weight perfluorochloroolefin polymer containing only chlorine and fluorine attached to the carbon chain produced by thermally cracking normally solid perfluorochloroolefin polymer and a minor proportion of a stabilizer comprising cadmium.

15. A novel composition which comprises an admixture of a low molecular weight open chain telomer containing a plurality of perfluorochloroolefin monomer units and halogen terminal groups and a minor proportion of a stabilizer comprising cadmium, said telomer containing only chlorine and fluorine attached to the carbon chain.

16. A novel composition which comprises an admixture of an open chain telomer containing a plurality of trifluorochloroethylene monomer units and chlorine terminal groups boiling between about −20 and about 270° C. at 0.5 mm. and a minor proportion of a stabilizer comprising cadmium.

17. A novel composition which comprises an admixture of an open chain telomer containing a plurality of trifluorochloroethylene monomer units and chlorine terminal groups boiling between about 95 and about 132° C. at 0.5 mm. and a minor proportion of a stabilizer comprising cadmium.

18. A novel composition which comprises an admixture of an open chain telomer containing a plurality of trifluorochloroethylene monomer units and chlorine terminal groups boiling between about 132° C. and about 170° C. at 0.5 mm. and a minor proportion of a stabilizer comprising cadmium.

19. A novel composition which comprises an admixture of an open chain telomer containing a plurality of trifluorochloroethylene monomer units and chlorine terminal groups boiling between about 170° C. and about 207° C. at 0.5 mm. and a minor proportion of a stabilizer comprising cadmium.

20. A novel composition which comprises an admixture of an open chain telomer containing a plurality of trifluorochloroethylene monomer units and chlorine terminal groups having a boiling range above about 207° C. at 0.5 mm. and a minor proportion of a stabilizer comprising cadmium.

References Cited in the file of this patent

UNITED STATES PATENTS

| | | |
|---|---|---|
| 2,096,737 | Dinley | Oct. 26, 1937 |
| 2,140,518 | Doolittle | Dec. 20, 1938 |
| 2,418,423 | Pellerano | Apr. 1, 1947 |

FOREIGN PATENTS

| | | |
|---|---|---|
| 525,048 | Great Britain | Aug. 20, 1940 |

UNITED STATES PATENT OFFICE

CERTIFICATE OF CORRECTION

Patent No. 2,922,824                                January 26, 1960

Francis J. Honn et al.

It is hereby certified that error appears in the printed specification of the above numbered patent requiring correction and that the said Letters Patent should read as corrected below.

Column 6, line 24, for "about" read -- above --; line 57, strike out "liquid"; line 62, for "stabilizing lower" read -- stabilizing liquid low --.

Signed and sealed this 19th day of July 1960.

(SEAL)
Attest:
KARL H. AXLINE
Attesting Officer

ROBERT C. WATSON
Commissioner of Patents